Patented Jan. 5, 1932

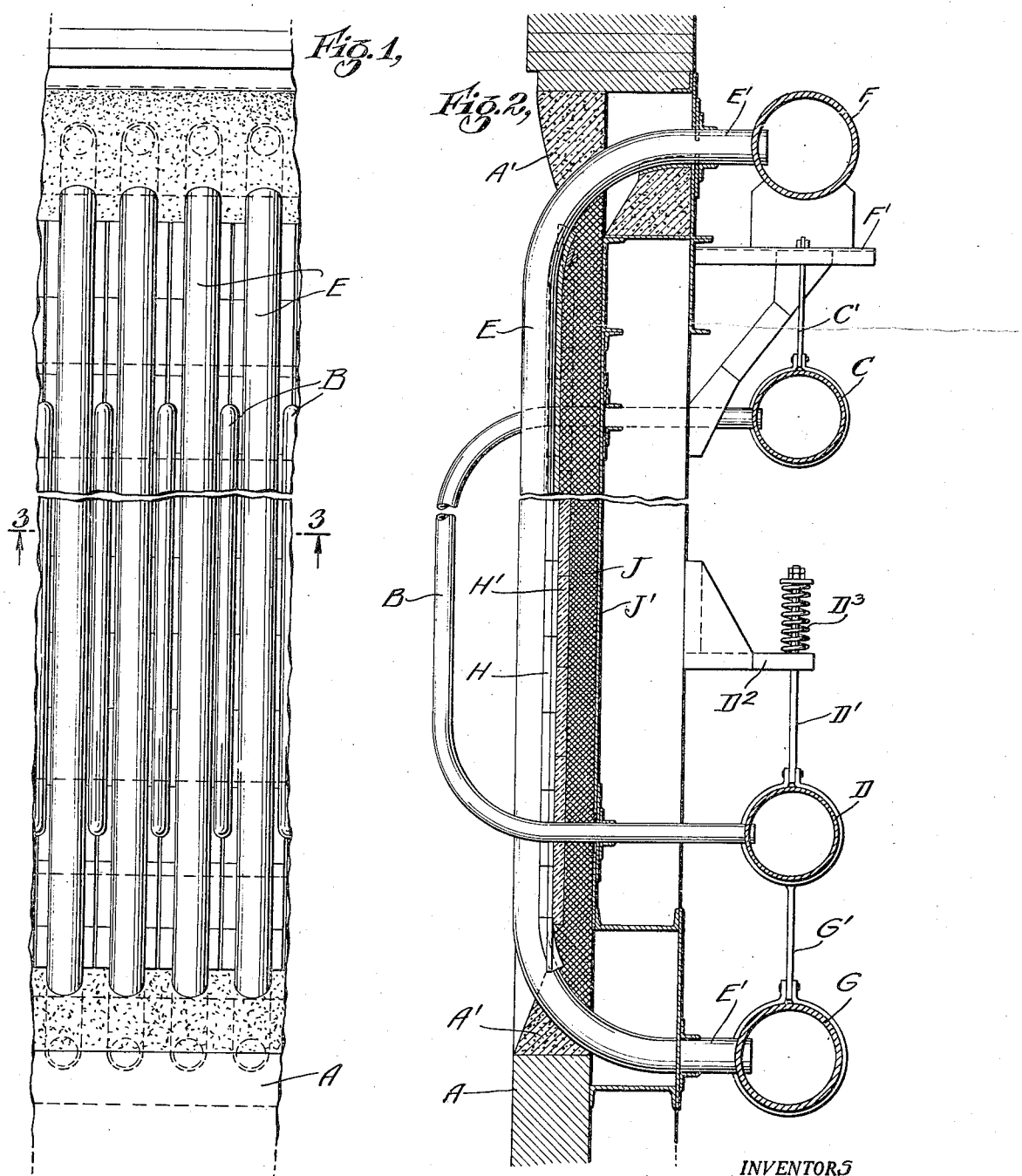

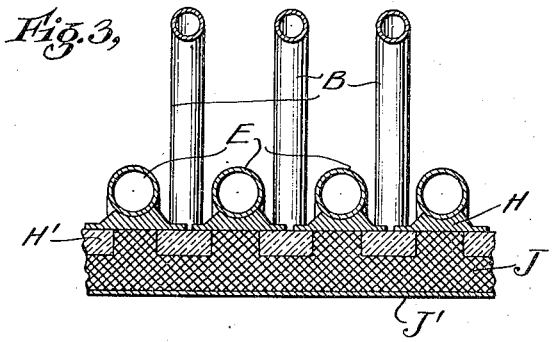
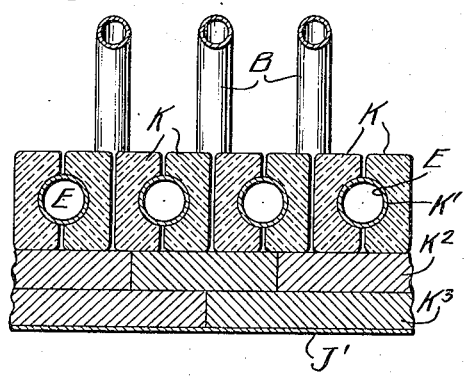
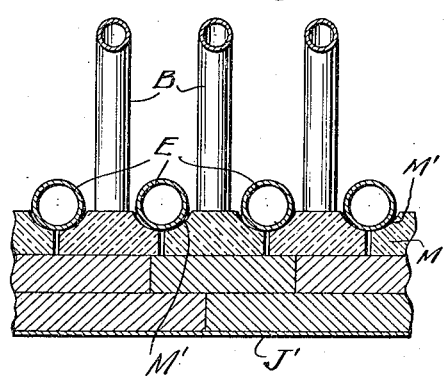
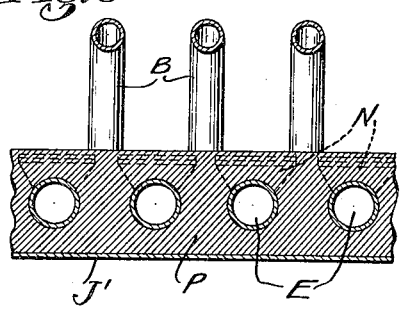
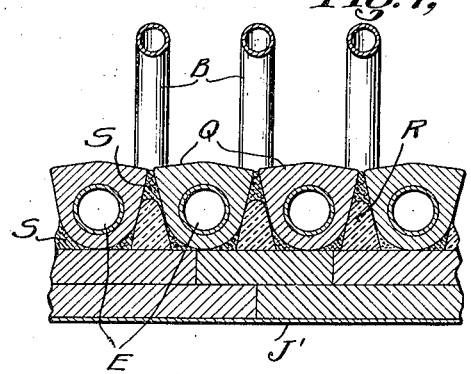

1,839,224

UNITED STATES PATENT OFFICE

WALTER F. KEENAN, JR., OF PELHAM, AND HAROLD F. EDDY, OF GREAT NECK, NEW YORK, ASSIGNORS TO FOSTER WHEELER CORPORATION, OF NEW YORK, N. Y., A CORPORATION OF NEW YORK

FLUID HEATING APPARATUS

Application filed February 7, 1929. Serial No. 338,226.

Our present invention relates to fluid heating apparatus wherein fluid containing conduits are so located in or adjacent to the furnace chamber of the apparatus that heat radiated from the source of heat and the furnace wall or walls adjacent said conduits forms the major portion of the heat absorbed by the fluid passing through said conduits.

While our invention is adapted for use in apparatus for heating various fluids, it is particularly useful in and will be described in connection with steam generating apparatus wherein fluid containing conduits are subjected to heat radiated thereto from an adjacent furnace wall and more specifically to steam generating apparatus wherein the fluid containing conduits are steam superheater elements in the form of round thin walled tubes widely spaced from one another and from the furnace wall in front of which they are disposed. Radiant heat absorbing elements of this form and so located are particularly advantageous as heat is absorbed on all sides of the tubes, the absorption at the rear being high enough to reduce the internal tube stresses to an unobjectionable amount and the wide spacing between the tubes and between the tubes and the adjacent furnace wall minimizing the troubles due to furnace dust and ash accumulations which have a tendency to bridge the spaces between the individual tube elements and between the tubes and wall. Radiant heat superheater tubes of this type are advantageously combined with other heat absorbing fluid conduits mounted on the inner face of or imbedded in the adjacent furnace wall. The furnace wall conduits may be water tubes forming a part of the boiler circulating system or additional steam superheater elements. Steam superheating apparatus of this type is described and claimed in our prior Patent No. 1,782,096, granted November 18, 1930.

The general object of our invention is to provide a simple and effective method of and means for regulating the amount of heat absorbed by the fluid in the conduits spaced from the furnace wall by controlling the heat radiating capacity of the furnace wall. A more specific object of our invention is to provide a method of and means for regulating the degree of superheat in radiant heat absorbing superheater constructions of the type described.

The various features of novelty which characterize our invention are pointed out with particularity in the claims annexed to and forming a part of this specification. For a better understanding of the invention, however, and the advantages possessed by it reference should be had to the accompanying drawings and descriptive matter in which we have illustrated and described a preferred embodiment of the invention.

Of the drawings:

Fig. 1 is a front view of the inner side of a furnace chamber wall of a steam generator to which our invention can be applied;

Fig. 2 is a vertical section through the furnace chamber wall of Fig. 1;

Fig. 3 is a section on the line 3—3 of Fig 1; and

Figs. 4, 5, 6 and 7 are views similar to Fig. 3 illustrating modified constructions of different heat radiating capacity.

In the construction shown in Figs. 1 to 3, A designates one of the furnace chamber walls of a steam generator on which a steam superheater comprising a plurality of superheater elements preferably in the form of round thin walled tubes B spaced from one another is arranged. The body portions of the tubes B are parallel to and spaced away from the inner surface of the furnace wall A. The end portions of each tube extend transversely to the length of the body portion through suitable openings in the furnace wall and are connected to external upper and lower headers C and D, respectively. Gas leakage through the wall openings may be prevented in any usual manner, for example, by packing the openings with non-rigid refractory material adapted to yield to accommodate relative movements of the parts resulting from thermal expansion and contraction.

Radiant heat superheater elements of this type are preferably used in conjunction with other heat absorbing fluid conduit elements E which may themselves constitute part of a furnace wall superheater or form part of the water circulating system of the steam generator in which the superheater is located. In the construction illustrated the tubes E comprise horizontally spaced body portions of greater length than the tubes B and extending above and below the transverse end portions of the latter, and having transverse end portions E' extending through the furnace wall into engagement with the externally positioned upper and lower headers F and G, respectively. Refractory material A' is positioned between the end connections E' and the adjacent portions of the furnace wall. As shown, the header F is seated on a furnace wall bracket F', from which the header C is suspended by strap connections C'. The header D is suspended by strap connections D' from a wall bracket D² through a compression spring D³. The header G is suspended from the header D by an encircling strap G'. This construction permits movement of the headers D and G relative to the headers C and F as the tubes B and E contract and elongate, thereby reducing the bending stresses impressed on the transverse end connections of the tubes.

In the construction shown the tubes E are thin walled water tubes having an external diameter slightly less than the distance between the adjacent superheater tubes B and the body portion of each tube E is seated in a metallic wall lining portion formed by sectional saddle blocks H. The latter are interposed between the outer sides of the tubes E and refractory material J enclosed by a wall casing J'. Advantageously, the saddle blocks engaging each tube E are welded to the latter. As shown in Fig. 3 the saddle blocks of adjacent tubes substantially meet edge to edge and battens H' close the joints between the adjacent blocks and prevent the material J from working through these joints.

In the described steam generator construction the tubes B are spaced from one another and from the tubes E and furnace wall in such a manner that a portion of the heating gases flows through said space and heat is absorbed by convection and radiation from the burning gases on all sides of the tubes B and by a large portion of the surface of the tubes E. Heat is also radiated from the intertube portions of the saddle blocks H to the adjacent tubes B and a portion of the tubes E and between the tubes B and E. The major portion of the heat absorbed by the steam passing through the tubes B is thus absorbed by radiation from the burning gases and the adjacent furnace wall and the degree of superheat obtainable in a construction of this type is in part proportional to the heat radiating capacity of the adjacent wall surface.

By the present invention the desired degree of superheat is obtained by controlling the amount of heat radiated by the furnace wall to the superheater tubes and particularly by varying the character of the exposed wall surface. In Figs. 4, 5, 6 and 7 modified furnace wall constructions are illustrated having heat radiating capacities different from the wall construction illustrated in Figs. 1 to 3.

In Fig. 4 the furnace wall comprises a series of water tubes E each provided with pairs of tile blocks K, cut away at one side K' to conform with the periphery of the corresponding tube E. The adjacent sides of each pair of tile blocks are substantially in contact and the inner surface of the blocks provide a substantially smooth inner face for the composite furnace wall. At the outer side of the blocks alternate layers of high and low temperature insulating bricks K² and K³, respectively, are provided, all of which are enclosed by the metallic casing J'. This wall construction has a greater heat radiating capacity than that of Fig. 3. The construction illustrated in Fig. 5 differs from that of Fig. 4 in that the water tubes E have only their rear portions covered by tile blocks. In this construction tile blocks M are positioned between each pair of water tubes with the inner corners M' of the tile blocks cut away to contact with the peripheral surface of the adjacent tubes. The exposing of the water tube surface decreases the heat radiating capacity of the wall. The substitution of the ceramic blocks M for the metallic saddles of Fig. 3, however, partly compensates for the loss in radiating capacity due to the exposed water tube surface.

In Fig. 6, the water tubes E are provided with projecting metallic fins N welded to the inner sides of the tubes and the combined tubes and fins are imbedded in a wall of initially plastic refractory material P. The water cooled furnace wall thus formed compares favorably with that of Fig. 4 in the heat radiating effect present.

The tubes E in the wall construction of Fig. 7 are provided with metallic blocks Q in lieu of the tile blocks K of Fig. 4. The inner sides of adjacent blocks form a substantially smooth metallic surface and the spaces between the blocks are filled by tile blocks R and refractory cement S. The substitution of metallic blocks for the tile blocks of Fig. 4 considerably decreases the heat radiating capacity of the wall in comparison with Fig 4.

From a comparison of the various types of wall construction illustrated in Figs. 3–7, it is apparent that the use of material having a relatively low coefficient of thermal conductivity, such as tile, at the inner face of the furnace wall increases the amount of heat radiated to the adjacent superheater elements and conversely, the use of material having a relatively high coefficient, increases the amount of heat conducted to the fluid in the wall conduits and lowers the heat radiating capacity of the wall. In any of the constructions illustrated, a portion of the wall formation may be varied by incorporating any of the other types of construction disclosed with a corresponding variation in the heat radiating capacity.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without a corresponding use of other features.

Having now described our invention what we claim as new and desire to secure by Letters Patent, is:

1. In fluid heating apparatus having a plurality of fluid conduit elements spaced from one of the furnace walls thereof, the method of regulating the amount of heat absorbed by the fluid in said conduits which comprises varying the heat radiating capacity of the adjacent furnace wall portions.

2. In fluid heating apparatus having a plurality of fluid conduit elements spaced from one of the walls thereof, the method of regulating the amount of heat absorbed by the fluid in said conduits which comprises varying the thermal properties of the portions of the furnace wall adjacent said elements.

3. The method of heating a fluid which consists in radiating heat from a wall to fluid containing conduits spaced from the wall and varying the heat radiating capacity of said wall in accordance with the amount of heat to be absorbed by the fluid passing through said conduits.

4. The method of heating a fluid which consists in maintaining a high temperature within an enclosed chamber, passing the fluid through spaced apart conduits having portions located within said chamber in proximity to but spaced away from one of the walls thereof and varying the heat radiating capacity of said wall to vary the amount of heat imparted to the fluid passing through said conduits.

5. In fluid heating apparatus having a plurality of fluid conduit elements spaced from a fluid cooled furnace wall thereof, the method of regulating the amount of radiant heat absorbed by said fluid conduit elements which comprises varying the proportions of material having high heat radiating properties and material having low heat radiating properties on the inner face of said wall.

6. In a steam generator furnace chamber having a plurality of steam superheater elements spaced from one of the walls thereof, the method of regulating the degree of superheat which comprises varying the heat radiating capacity of the adjacent portions of the furnace wall.

7. In a steam generator furnace chamber having a plurality of steam superheater elements spaced from one of the walls thereof, the method of regulating the degree of superheat which comprises varying the thermal character of the portions of the furnace wall adjacent said elements.

8. In a steam generator furnace chamber having a plurality of superheater elements spaced from a fluid cooled wall thereof, the method of regulating the degree of superheat which comprises controlling the amount of heat radiated from said wall to said superheater elements.

9. In steam generator furnace chambers having a plurality of steam superheater elements spaced from a fluid cooled wall thereof, the method of regulating the degree of superheat obtainable which comprises varying the proportions of material having high heat radiating properties and material having low heat radiating properties on the inner face of said wall, whereby the amount of heat radiated from said wall to said superheater elements is controlled.

10. The method of regulating the degree of superheat obtainable in steam generators having a plurality of superheater elements spaced from one another and from a plurality of water tubes forming a part of an adjacent furnace wall which comprises covering a portion of said water tube surface with a material having a predetermined heat radiating effect on said superheater elements.

11. The method of regulating the degree of superheat obtainable in steam generators having a plurality of superheater elements spaced from one another and from a plurality of water tubes forming part of an adjacent furnace wall which comprises covering said water tubes with blocks of material having a high or low coefficient of thermal conductivity in accordance with the desired degree of superheat.

12. The method of regulating the degree of superheat obtainable in steam generators having a plurality of superheater elements spaced from one another and from a plurality of water tubes imbedded in an adjacent furnace wall which comprises varying the heat conducting character of the material between said water tubes and the inner face of the furnace wall in accordance with the degree of superheat desired.

13. The combination with a furnace chamber wall of a steam generator, of thin walled radiant heat absorbing superheater elements adjacent said wall at the furnace chamber side of the latter, said elements being spaced from one another and from said wall, a plurality of thin walled heat absorbing tube elements between said superheater elements and said wall, and a plurality of blocks of material having definite heat radiating capacity covering a portion of said last mentioned elements and said furnace wall.

14. The combination with a furnace chamber wall of a steam generator, of thin walled radiant heat absorbing superheater tube elements adjacent said wall at the furnace chamber side of the latter, said elements being spaced from one another and from said wall, a plurality of thin walled radiant heat absorbing water tube elements spaced from one another and between said superheater tubes and said furnace wall, and a plurality of blocks of ceramic material mounted on said water tubes and filling said inter-tube spaces.

Signed at New York city, in the county of New York and State of New York, this 4th day of February, A. D. 1929.

WALTER F. KEENAN, JR.
HAROLD F. EDDY.